(12) United States Patent
Comerford et al.

(10) Patent No.: US 9,869,335 B2
(45) Date of Patent: Jan. 16, 2018

(54) BAR COUPLER

(71) Applicant: Nexus Couplers Pty Ltd, Glen Aplin, Queensland (AU)

(72) Inventors: Ernest Frederick Comerford, Glen Aplin (AU); Mark Andrew Rankin, Kangaroo Point (AU)

(73) Assignee: Nexus Couplers Pty Ltd, Glen Aplin (AU)

( * ) Notice: Subject to any disclaimer, the term of this patent is extended or adjusted under 35 U.S.C. 154(b) by 574 days.

(21) Appl. No.: 14/449,392

(22) Filed: Aug. 1, 2014

(65) Prior Publication Data

US 2015/0056008 A1    Feb. 26, 2015

Related U.S. Application Data

(63) Continuation of application No. 13/390,498, filed as application No. PCT/AU2010/001033 on Aug. 13, 2010, now abandoned.

(30) Foreign Application Priority Data

Aug. 14, 2009   (AU) ................. 2009903830

(51) Int. Cl.
*E04C 5/16*   (2006.01)
*F16B 21/12*  (2006.01)
(Continued)

(52) U.S. Cl.
CPC .............. *F16B 21/12* (2013.01); *E04C 5/165* (2013.01); *E04C 5/18* (2013.01); *F16B 2021/14* (2013.01);
(Continued)

(58) Field of Classification Search
CPC ... E04C 5/03; E04C 5/165; E04C 5/18; F16B 21/10; F16B 21/12; F16B 2021/14;
(Continued)

(56) References Cited

U.S. PATENT DOCUMENTS 2,278,324 A * 3/1942 Kollmann ................. F16D 1/02
                                                    267/166
2,588,901 A * 3/1952 Weikart .................. E21B 10/44
                                                    175/394
(Continued)

FOREIGN PATENT DOCUMENTS

DE        4307168       9/1994
FR     2533648 B1       3/1984
(Continued)

OTHER PUBLICATIONS

International Search Report and Written Opinion dated Dec. 1, 2010 for PCT/AU2010/001033 filed Aug. 13, 2010.
(Continued)

*Primary Examiner* — Josh Skroupa
(74) *Attorney, Agent, or Firm* — Galgano IP Law PLLC; Thomas M. Galgano; Jessica G. McDonald

(57) ABSTRACT

A coupler or connector for joining bars, for example reinforcing bars, including an elongate rod member adapted to be inserted into a tubular sleeve member. The rod and sleeve members each have one or more transverse holes which align when the rod member is inserted into the sleeve member. In operational use, the rod and sleeve members are attached to the free ends of the bars to be connected. One or more transverse pins are then driven into the holes which are aligned in order to lock the rod and sleeve member together thereby connecting the bars. The pins can be spring loaded. There can be a plastic sleeve adapted to retain the pins in position. The plastic sleeve is slid off during assembly to allow the pins to engage the holes in the sleeve member(s).

11 Claims, 17 Drawing Sheets

(51) Int. Cl.
*E04C 5/18* (2006.01)
*F16B 21/14* (2006.01)

(52) U.S. Cl.
CPC ...... *Y10T 403/5741* (2015.01); *Y10T 403/598* (2015.01)

(58) Field of Classification Search
CPC ........... Y10T 403/553; Y10T 403/5741; Y10T 403/589; Y10T 403/598; Y10T 403/599; Y10T 403/602; Y10T 403/604; Y10T 403/7018; Y10T 403/7041; Y10T 403/7079; Y10T 403/7081; Y10T 403/7083; Y10T 403/7088
USPC ....... 403/294, 306, 320, 324, 325, 327, 328, 403/355, 362, 378, 379.1, 379.2, 379.5
See application file for complete search history.

(56) References Cited

U.S. PATENT DOCUMENTS

| | | | |
|---|---|---|---|
| 2,696,090 A | 12/1954 | Harrington | |
| 3,449,003 A | 6/1969 | Hunt | |
| 4,042,305 A | 8/1977 | Vincent | |
| 4,127,354 A | 11/1978 | Mixon, Jr. | |
| 4,508,468 A | 4/1985 | Irwin | |
| 4,626,123 A * | 12/1986 | Brown | E04B 1/1906 248/160 |
| 5,083,883 A | 1/1992 | Ueda et al. | |
| 5,255,993 A | 10/1993 | Kovacs | |
| 5,320,439 A * | 6/1994 | Perrault | F16L 3/22 248/58 |
| 5,452,623 A * | 9/1995 | Knight | B60K 20/04 403/225 |
| 5,729,952 A * | 3/1998 | Dahl | E04C 5/165 29/437 |
| 6,202,282 B1 | 3/2001 | Holdsworth | |
| 6,321,501 B1 | 11/2001 | Ignash | |
| 6,565,280 B1 | 5/2003 | Post | |
| 6,688,800 B2 | 2/2004 | Kresge | |
| 6,854,916 B2 | 2/2005 | Hsieh | |
| 2002/0157333 A1 | 10/2002 | Kadotani et al. | |
| 2003/0215283 A1 | 11/2003 | Hsieh | |
| 2009/0095856 A1* | 4/2009 | Nakatani | F16B 7/042 248/177.1 |

FOREIGN PATENT DOCUMENTS

| | | |
|---|---|---|
| JP | 9-279767 | 10/1997 |
| JP | 2003-278783 | 10/2003 |
| WO | 2008/089056 | 7/2008 |

OTHER PUBLICATIONS

International Preliminary Report on Patentability dated Jun. 21, 2011—for PCT/AU2010/001033 filed Aug. 13, 2010.
U.S. Office Action dated Oct. 19, 2012 for corresponding U.S. Appl. No. 13/390,498.
U.S. Office Action dated Mar. 15, 2013 for corresponding U.S. Appl. No. 13/390,498.
U.S. Office Action dated Oct. 8, 2013 for corresponding U.S. Appl. No. 13/390,498.

* cited by examiner

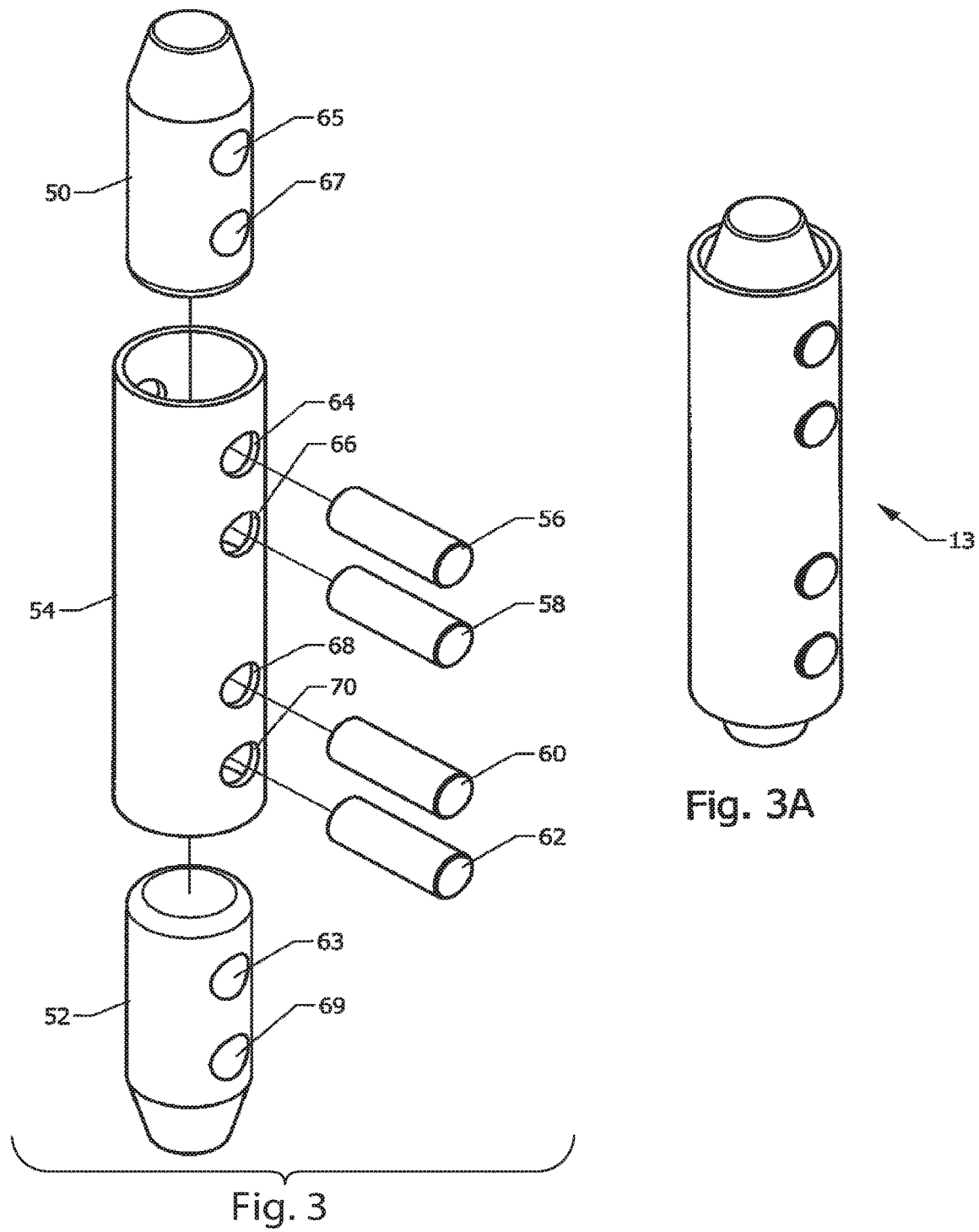

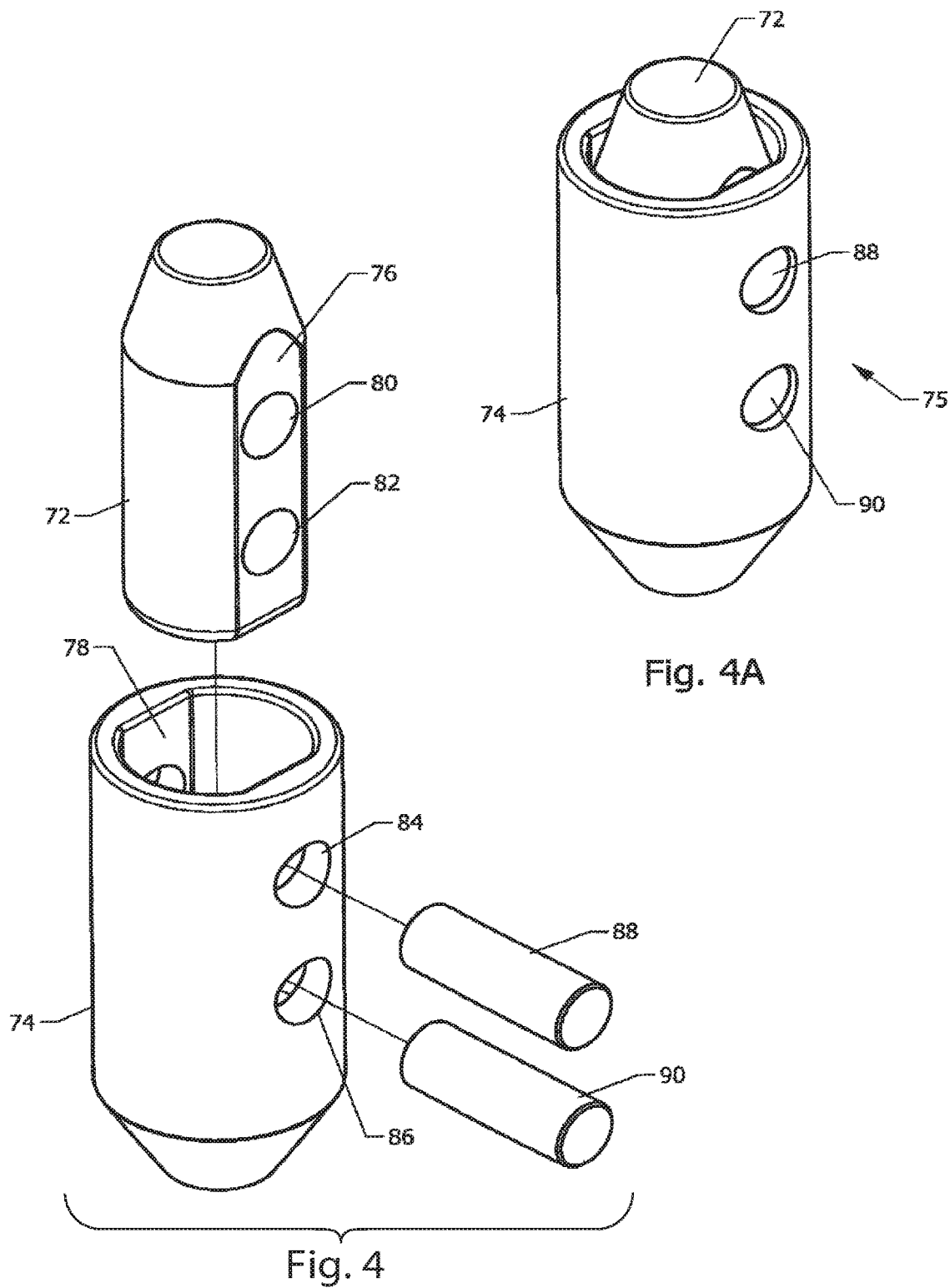

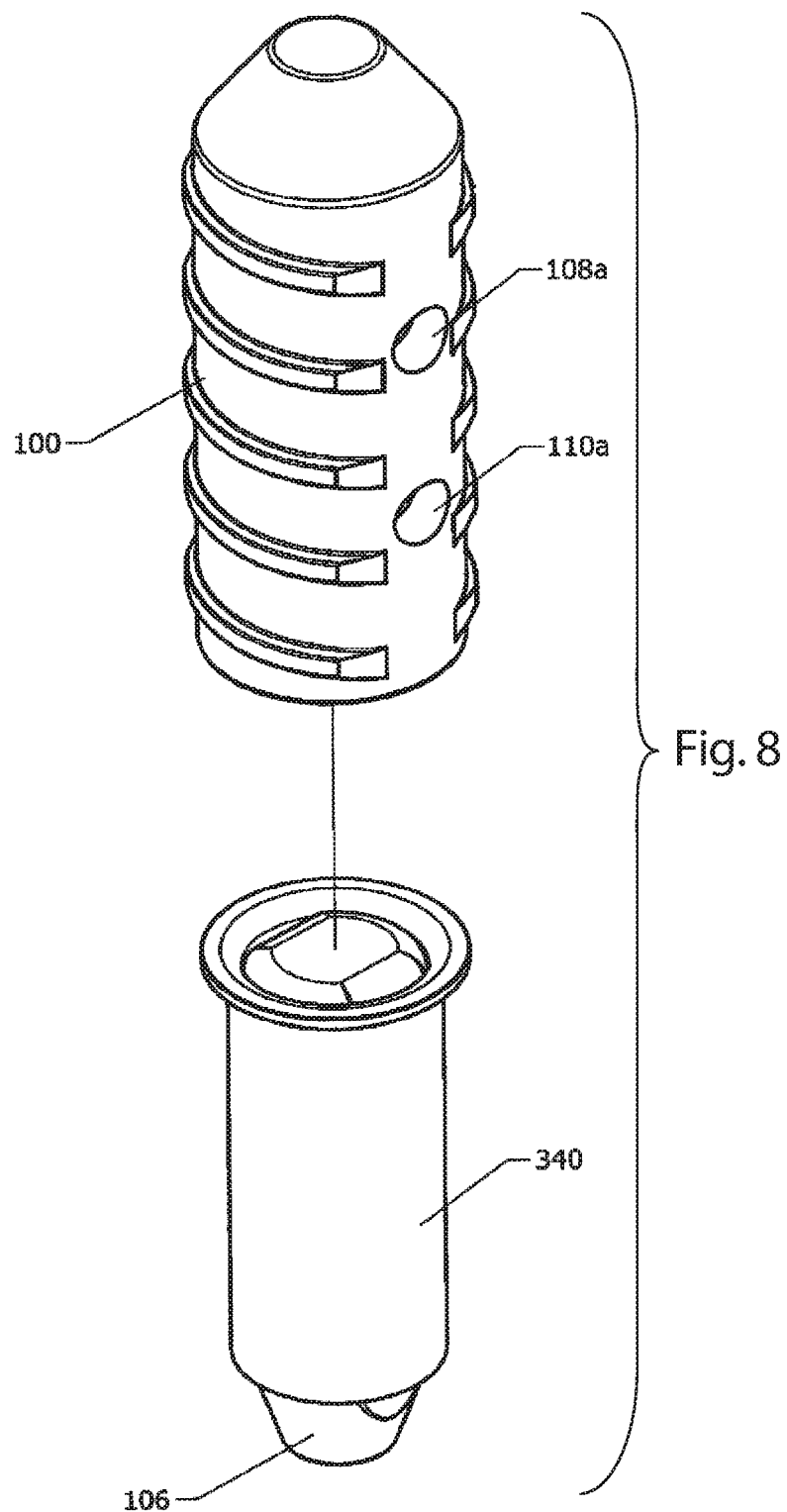

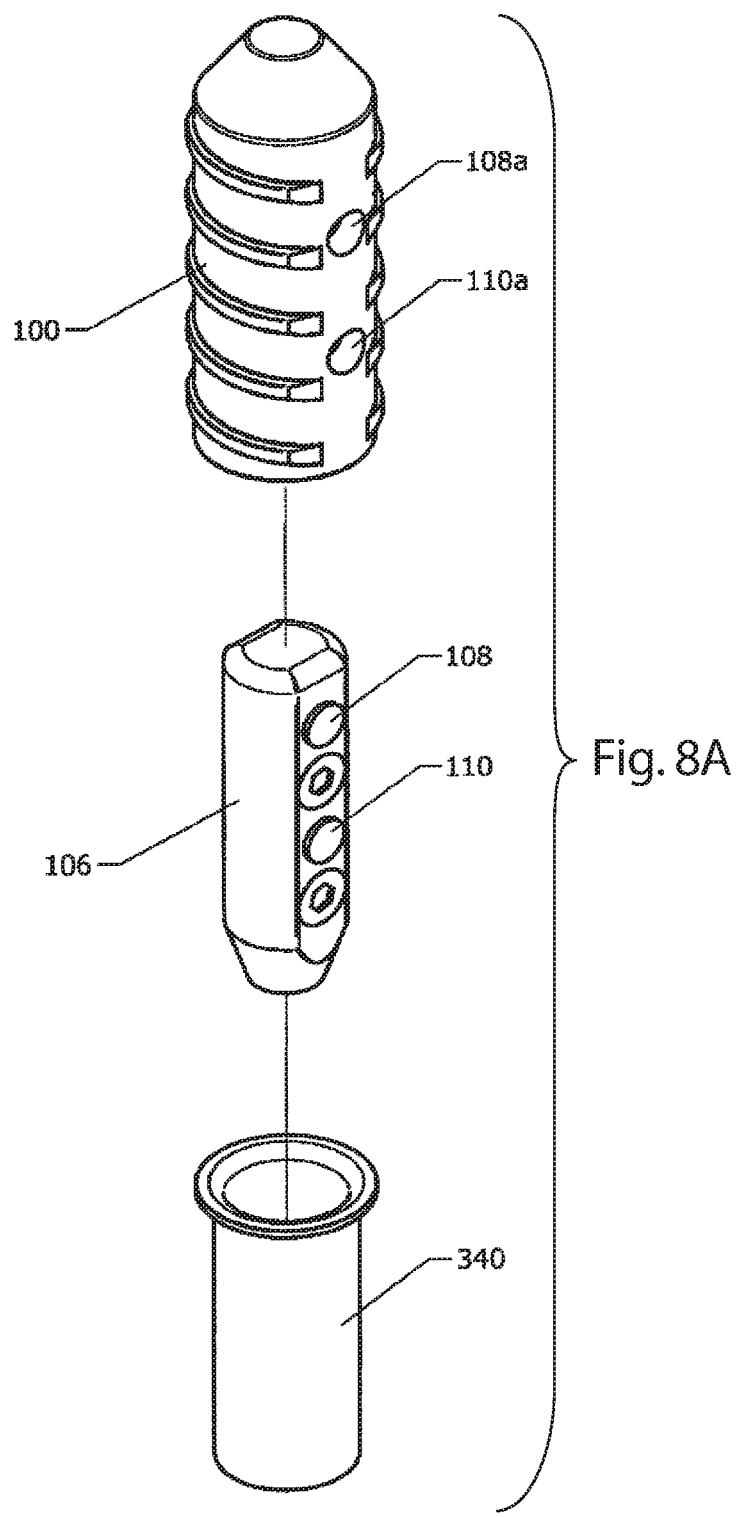

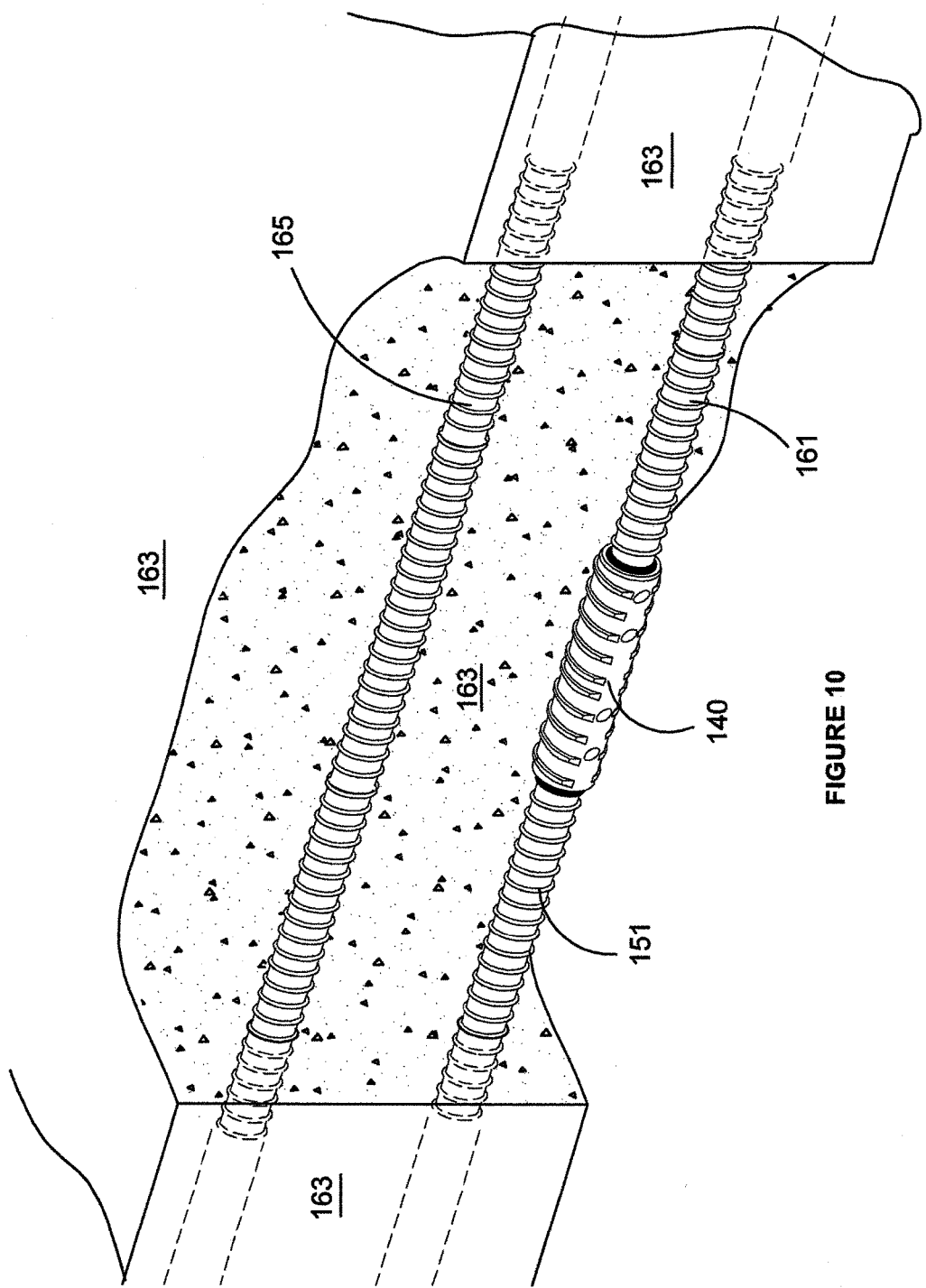

BAR COUPLER

FIELD OF THE INVENTION

This invention relates to building components for joining solid, tubular, or plain bar, in particular, but not exclusively to, a coupler or connector for joining reinforcing bar in concrete structures.

BACKGROUND OF THE INVENTION

There are numerous existing methods and apparatus for mechanically coupling or joining bars in the building industry. One important problem encountered is the joining of reinforcing bars used in reinforced concrete structures. While welding the bars together may appear to be the most effective method, the process of welding affects the martensitic structure of the individual bars resulting in an under-strength joint.

One prior art method relies on threading the ends of reinforcing bars to be joined, so that they can be screwed into an intermediate coupler in which female threads have been cut. This method, however, has the disadvantage of strength, having to directly thread the bar itself, thereby removing an outer layer of the reinforcing bar with the consequential reduction of the strength of the coupled joint.

A further method used in the prior art to join reinforcing bars requires that an outer tube be placed over the ends of the bars to be joined and fractable studs to be screwed in to engage the bars. This method is costly and relies on on-site work skills in ensuring that the coupler is installed correctly.

A further method requires one of the bars to be contained within an outer tubing wherein the outer tubing is filled with a non shrink grout. This method requires a very large outer tube which often cannot conform to concreting cover requirements and requires a high level of skill to be correctly installed.

Yet a further method involves the ends of reinforcing bars to be forged so that the forged ends can be connected without the need of rotating the bars. This method requires a third part outer sleeve or other method of containing the joined bars during construction. One example of this latter method is where the forged ends resemble castellations or interlocking tongues and grooves which require a sleeve in order to maintain the co-axial integrity of the join. This method has the disadvantage of having to be tightly constrained by an outer tube or similar device during installation.

A further method of joining reinforcing bars requires the friction welding of matching male and female threaded ends to lengths of reinforcing bar. These matching ends can be joined by counter rotating the bars so that the friction welded joiner ends screw together. This method has the disadvantage of requiring long lengths of bar to be rotated by the number of turns needed to complete the screwing together of the joint.

In all of the above prior art methods of joining reinforcing bars, not only is there a reliance on the skill of the operator, but the actual diligence of the operator to effect a secure join. There have been instances of screwed joints which have only been screwed a few turns on the end of the bars because of laziness or carelessness on the part of the operator. This can have dire consequences, especially in high rise buildings which rely on the integrity of reinforced concrete structures several floors up.

OBJECT OF THE INVENTION

It is therefore an object of the invention to provide a novel and innovative coupler for joining bars, for example reinforcing bars, which seeks to address some of the disadvantages of the prior art and also to provide the public with an alternative and useful choice.

STATEMENT OF INVENTION

In one aspect, the invention resides in a coupler or connector for joining bars including, an elongate rod member adapted to be inserted into a tubular sleeve member, the rod and sleeve members each having one or more transverse holes which align when the rod member is inserted into the sleeve member;

one or more transverse pins adapted to pass through the one or more aligned holes, wherein in use, the rod and sleeve members are attached to the free ends of the bars to be connected and when in the inserted position, the transverse pins can be driven into the aligned holes to lock the rod and sleeve members together thereby connecting the bars.

In another example, the invention resides in a coupler or connector for joining bars including, an elongate rod member adapted to be inserted into a pair of opposed tubular sleeve members, the rod and sleeve members each having one or more transverse holes which align when the rod member is inserted into the sleeve members;

one or more transverse pins adapted to pass through the one or more aligned holes, wherein in use, the opposed sleeve members are attached to the free ends of the bars to be connected and when the rod member is in the inserted position, the transverse pins can be driven into the aligned holes to lock the rod and sleeve members together thereby connecting the bars.

In another example, the invention resides in a coupler or connector for joining bars including, a tubular sleeve member adapted to be able to accept a pair of opposed elongate rod members, the rod and sleeve members each having one or more transverse holes which align when the rod member is inserted into the sleeve members;

one or more transverse pins adapted to pass through the one or more aligned holes, wherein in use, the opposed rod members are attached to the free ends of the bars to be connected and when the rod members are in the inserted position, the transverse pins can be driven into the aligned holes to lock the rod and sleeve members together thereby connecting the bars.

In another example of the invention, the elongate rod members and the sleeve member have one or more matching shaped faces to facilitate the assembly of the elongate inner rod and the outer tube sleeve. When the inner elongate rod is inserted into the tube member, the matching shaped faces will cause the holes in the respective parts to be brought into alignment so that the assembler can insert the pins with reasonable ease.

In an alternative example, the pins can be replaced by screws, bolts, or any suitable fastener.

In a further alternative example, the pins may be spring loaded and restrained in wells in the body of the elongate rod members.

Suitably, the coupler or connector is of cast and/or machined high tensile steel or of equivalent strength material.

Preferably, the attachment of the rod and sleeve members to the bars is by means of friction welding.

In the alternative, the rod and sleeve members may be attached to the bars by arc welding, gas welding, screw-on means, or with other acceptable methods.

Suitably, a transparent tube or "clip on" device is used to constrain the pins during the construction phase, including the placement and vibration of the enclosing concrete, thereby allowing the inspecting Engineer to verify that the pins are in place and that the join is correct.

In another example, there can be a plastic sleeve associated with the rod member(s) to constrain the pins wherein the plastic sleeve is displaced as the rod member(s) is inserted into the sleeve member(s) thereby releasing the pins for engagement with the holes of the sleeve member(s).

Suitably, the number of align-able holes and the number of transverse pins depends on the tensile load specified to be carried by the joined bars.

Suitably, the dimensions of the rod and sleeve members likewise depends on the specified loading.

Accordingly, the diameter of the pins and the align-able holes are also determined by the shear load required to be borne by the pins.

Preferably, the pins have an interference fit with the holes.

Alternatively, the pins can have a knurled portion which grips part of the hole as the pin is driven in.

In the alternative, the pins can be mildly tapered to provide an enhanced interference fit.

Preferably, the rod and sleeve members are of a rod and cylinder configuration.

In the alternative, the rod and sleeve members may be of a square or rectangular or elliptical configuration.

In a preferred version, the rod and sleeve members are externally configured or patterned by having ridges or indentations to match the outer surface of the reinforcing bars to which they are attached and join and directed to improving adherence to surrounding concrete.

BRIEF DESCRIPTION DRAWINGS

In order for the invention to be better understood and put into practical effect reference will now be made to the accompanying illustrations, wherein;

FIGS. 1 and 1A show a perspective view of a preferred embodiment of the invention used in joining reinforcing bars according to Example 1;

FIGS. 2 and 2A show Example 2 of the invention;
FIGS. 3 and 3A show Example 3 of the invention;
FIGS. 4 and 4A show Example 4 of the invention;
FIGS. 5 and 5A-5C show Example 5 of the invention;
FIGS. 6 and 6A show Example 6 of the invention, and
FIGS. 7 and 7A show Example 7 of the invention.

FIGS. 8 and 8A and FIGS. 9 and 9A show the use of the sleeve with Example 5 and Example 1, respectively, of the invention.

FIG. 10 shows the coupler of FIG. 6 encased in concrete when in use.

DETAILED DESCRIPTION OF THE DRAWINGS

EXAMPLE 1

Figure 1:
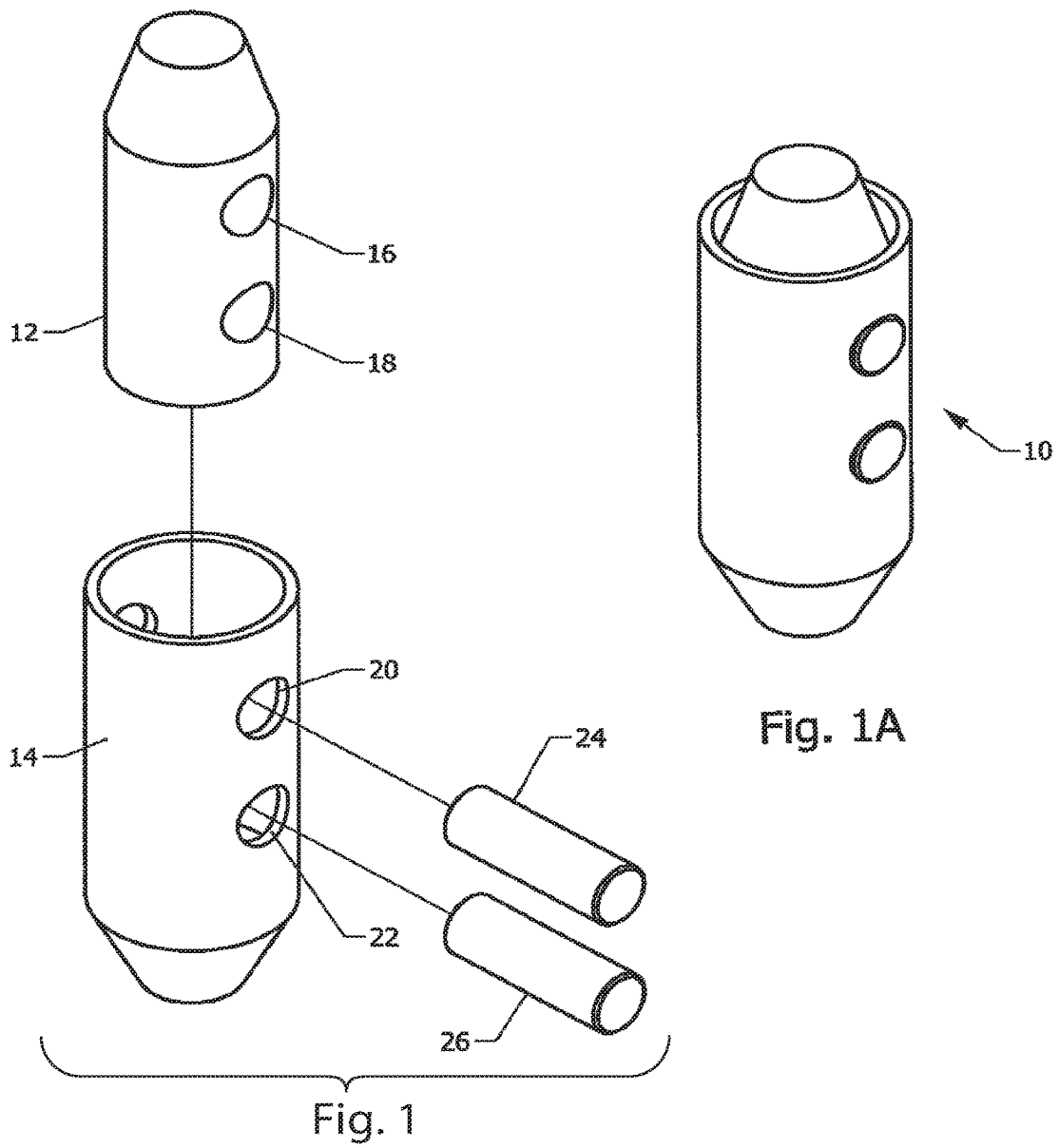

Referring now to the figures and initially FIG. 1 there is shown an isometric perspective view of a preferred coupler or connector 10 according to the invention according to Example 1.

The coupler or connector in this example is used for connecting reinforcing bars which are used in reinforced concrete structures. The coupler or connector comprises an elongated rod 12 or male member adapted to be inserted into a female tubular 14 or sleeve member. There are one or more holes in the rod 16, 18 and sleeve members 20, 22 which can be aligned when the rod is inserted into the sleeve. Transverse pins 24, 26 are then driven into the holes which are aligned in order to lock the rod and sleeve member together. As herein before described the pin members can be configured to have a slight taper, a knurled portion, or are of dimensions which provide a strong interference fit into the holes of the rod and sleeve members, thereby locking the pins. It will be obvious to the skilled addressee that when concrete is poured around the connector that the pins will remain in place in any event. In other examples or applications, the pins may be replaced by screws, bolts, or any other suitable fastener.

The rod and sleeve members are connected to reinforcing bars preferably by means of friction welding undertaken when the reinforcing bars leave the supplier or factory.

In the alternative, there may be other methods of joining the rod and sleeve member which can of course include threading and screwing the rod and sleeve members onto the ends of reinforcing bars to be joined.

EXAMPLE 2

Figures 2, 2A:
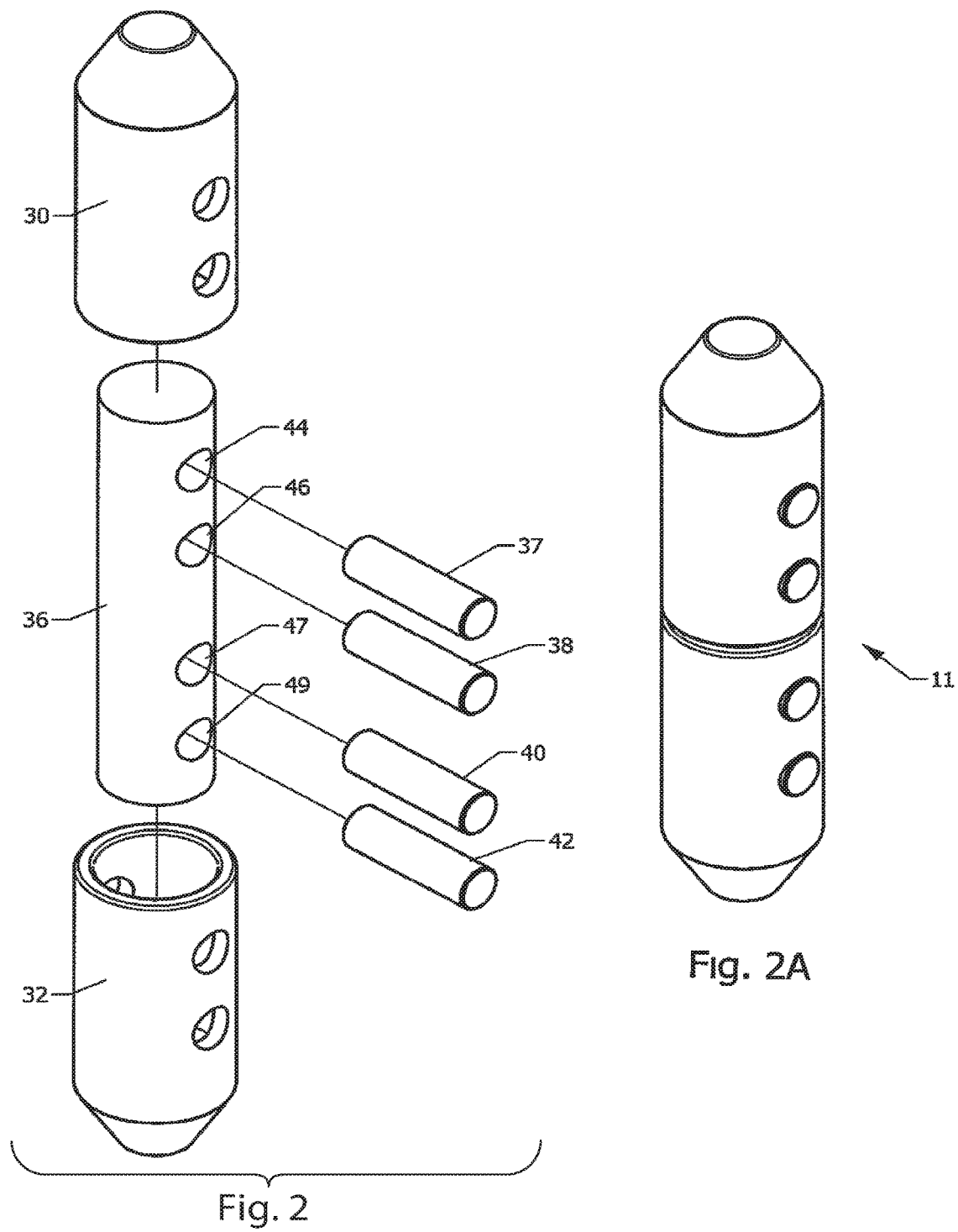

FIG. 2 shows Example 2 of the invention 11 wherein there are two opposed sleeve members 30, 32 attached to reinforcing bars (not shown) to be connected. The separate rod member 36 is inserted into, and connects, the opposed sleeve members by means of the pins 37, 38, 40, 42 driven into the aligned holes 44, 46, 47, 49. As previously indicated the load bearing characteristics are determined by the number of holes through which pins (or screws, bolts, or any other suitable fastener) are inserted.

EXAMPLE 3

FIG. 3 shows Example 3 of the invention 13 wherein there are two opposed rod members 50, 52 attached to reinforcing bars (not shown) to be connected. The two opposed rod members are inserted into the separate sleeve member 54 and the pins 56, 58, 60, 62 driven into the aligned holes 64, 66, 68, 70 and 65, 67, 63, 69. As previously indicated the load bearing characteristics are determined by the number of holes through which pins (or screws, bolts, or any other suitable fastener) are inserted.

EXAMPLE 4

FIG. 4 shows Example 4 of the invention where the elongate rod member 72 and the sleeve member 74 have one or more matching faces 76, 78 to facilitate the assembly of the elongate inner rod 72 and the outer tube sleeve 74. When the inner elongate rod is inserted into the sleeve member, the matching faces 76, 78 will cause the holes 80, 82 and 84, 86 in the respective parts to be bought into an alignment so that the assembler can insert the pins 88, 90 with reasonable ease.

FIG. 4A shows Example 4 of FIG. 4 as a complete assembly 75.

EXAMPLE 5

Figure 5:
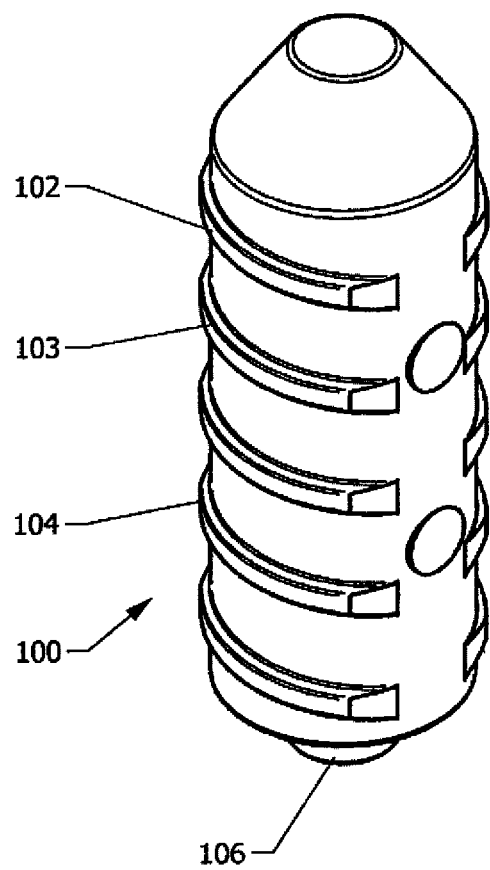
Figure 5A:
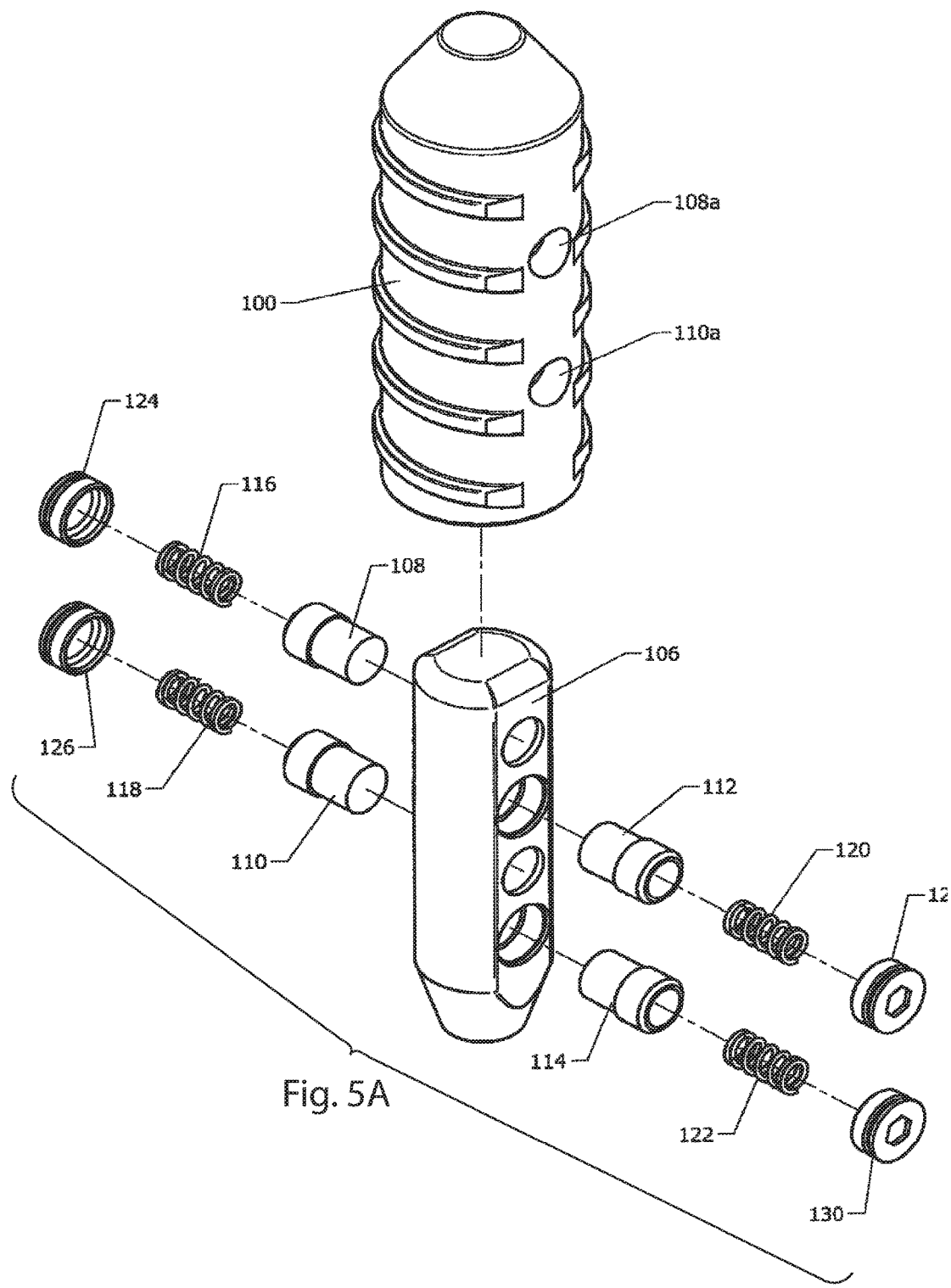
Figure 5B:
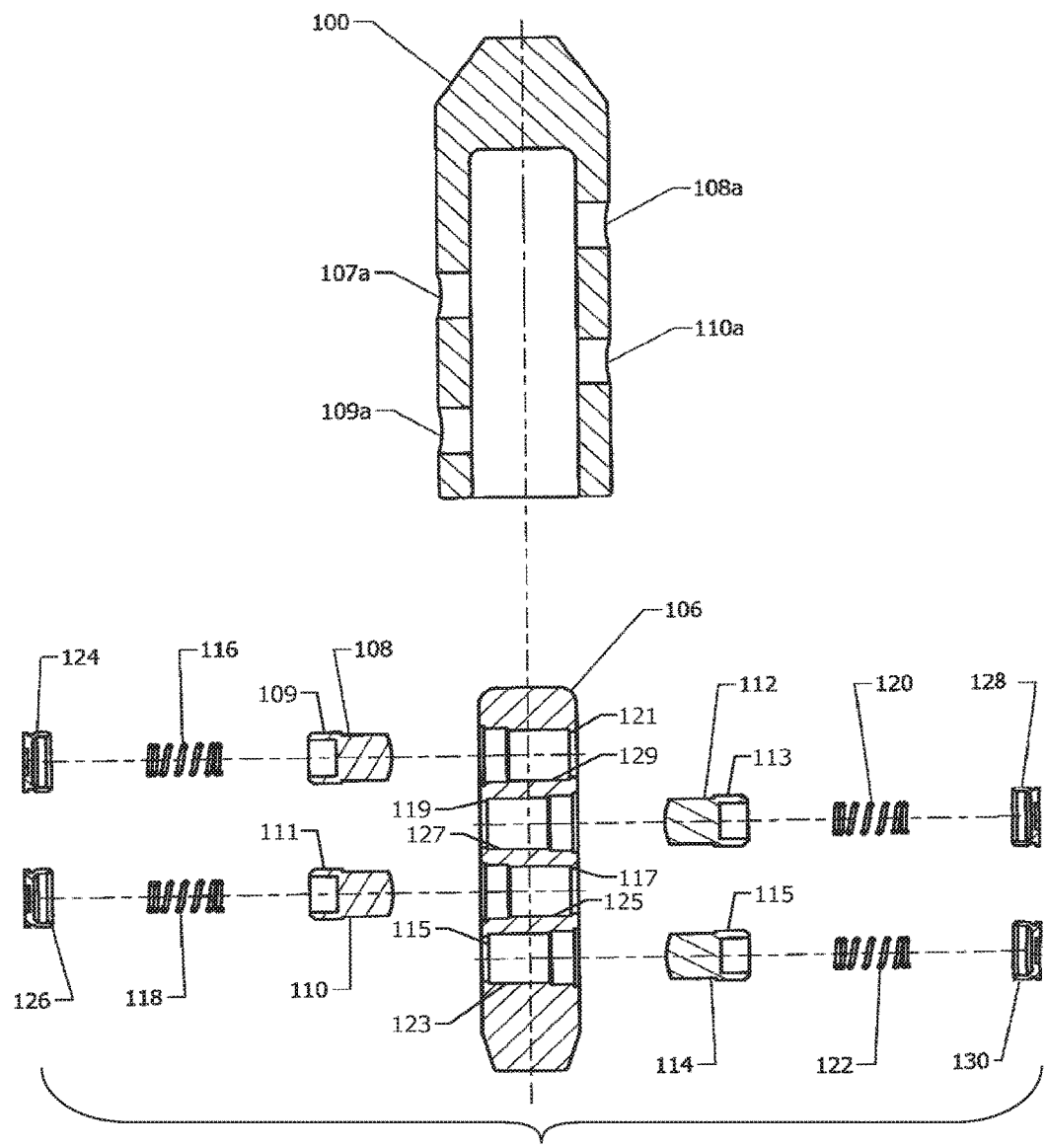
Figure 5C:
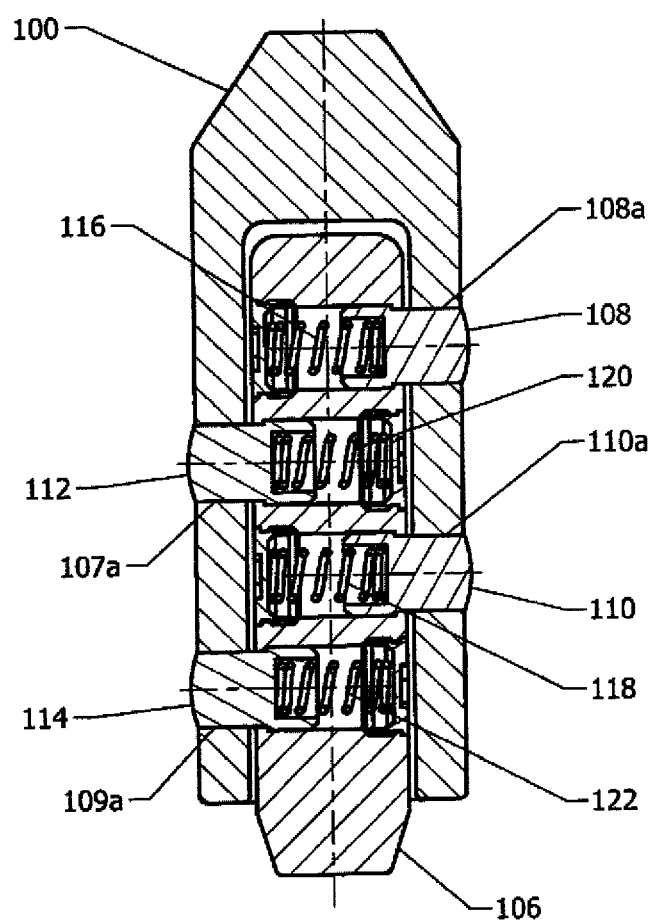

FIGS. 5 to 5C shows Example 5 of the invention wherein the outer surface of the sleeve member 100 has ridges for example, 102, 103, 104 which match the ridges on re-inforcing bars (not shown), said ridges directed to improving adherence to surrounding concrete.

FIG. 5A shows an exploded view of the rod 106 and sleeve member 100 of FIG. 5 wherein the rod member has spring load pin assemblies (see also 5B) including detent pins 108-114 having enlarged base portions 109-113 which abut shoulder stops 115-121 in holes 123-129 in the rod 106 and then engage holes, for example, 108a, 110a in the sleeve member when assembled. By pushing the detent pins against the captive springs 116-122 and held in place in the rod member by locking members shown as the grub screws 124-130, the rod member can be inserted into the sleeve member so that the pins engage the holes in the sleeve member locking together both rod and sleeve members when the compression of the springs is released.

FIG. 5B shows a transverse cross-section of the rod 106 and sleeve member 100 of FIG. 5, showing the offset positions of the holes 107a-110a in the sleeve member and the offset position of the complementary pin members 108-114 housed in the rod member. As previously described, the compression springs 116-122 are partially housed in the pin members and secured in place by means of the threaded grub screws 124-130 which are located in the rod member.

FIG. 5C shows the complete assembly of the sleeve 100 and rod member 106 of FIG. 5B inserted in the operational position. As will be noted, the pin members 108-114 fully extend into holes 107a-110a in the sleeve member, when the compression springs 116-112 are released and the rod and sleeve members can only disengage on pushing the pin members against the compression springs.

EXAMPLE 6

Figure 6:
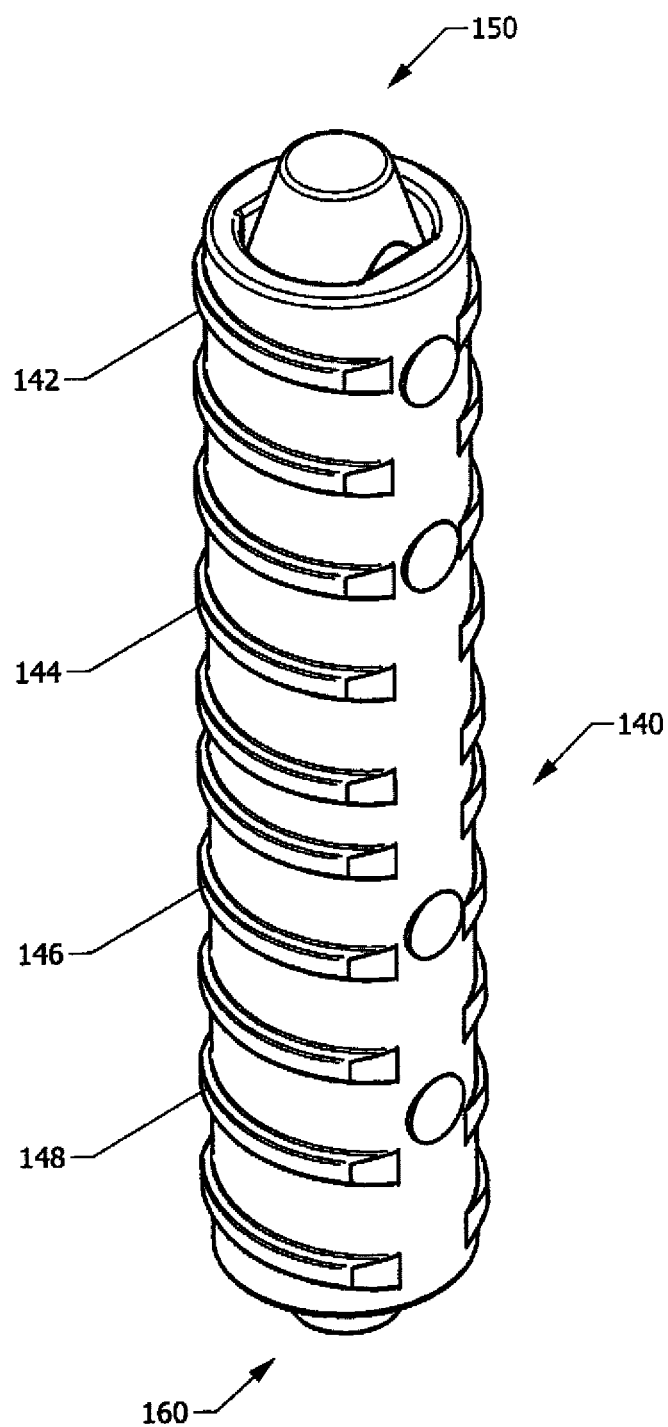
Figure 6A:
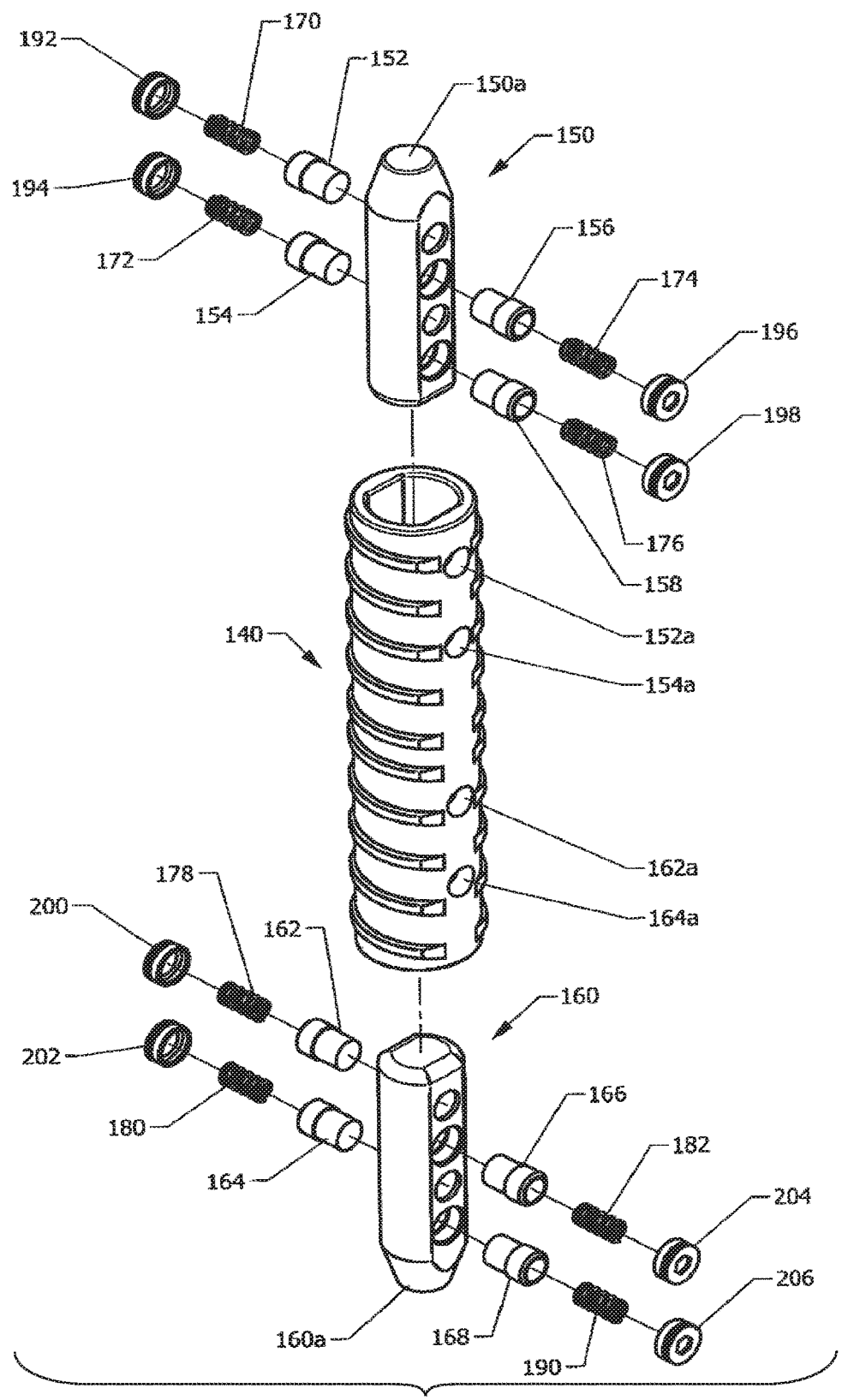

FIGS. 6 and 6A show a double sleeve member 140 having external ridges, for example 142, 144, 146, 148 matching that of the re-inforcing bars 151, 161 (FIG. 10) which are connected to the rod members 150, 160. FIG. 10 shows the assembly 140 of FIG. 6 when in use. Reinforcing bars 151 and 161 have been welded to tapered ends 150a and 160a of the rod members 150, 160. The coupler connected bars 151, 161 and bar 165 are encased in concrete 163. The cut out in concrete 163 is for illustration purposes only.

FIG. 6A shows an exploded view of the assembly of FIG. 6 wherein the opposed rod members 150, 160 are inserted into the double length sleeve member 140. The rod members engage the sleeve member by means of spring detent pins 152-158 and 162-168, which engage the holes 152a, 154a, and 162a, 164a in the sleeve member.

As previously shown and described with Example 5, pushing against the compression springs 170-176 and 178-190 enables the rod members to be inserted into sleeve member wherein on the release of the compression of the springs when the pin members locate the holes for example, 152a, 154a, 162a, 164a of the sleeve member, the rod members are firmly engaged in the sleeve member.

The reinforcing bars which are joined by the rod members are not shown, but as has previously discussed are actually welded to tapered ends 150a, 160a of the rod members.

As with previous examples, the pins and springs are held the rod in the rod members by grub screws 192-198 and 200-206.

EXAMPLE 7

Figure 7:
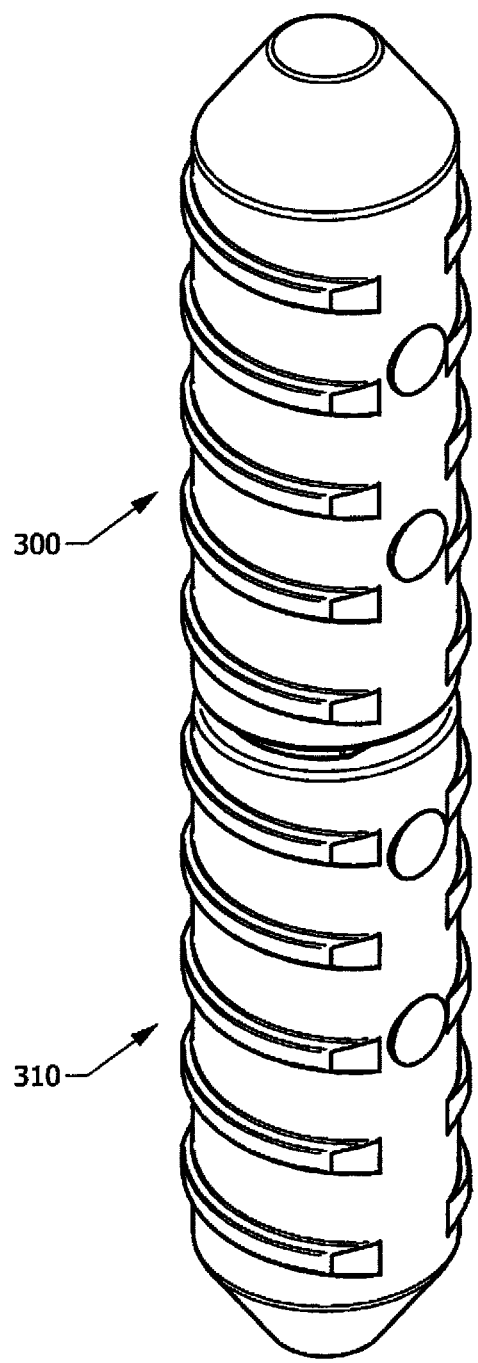
Figure 7A:
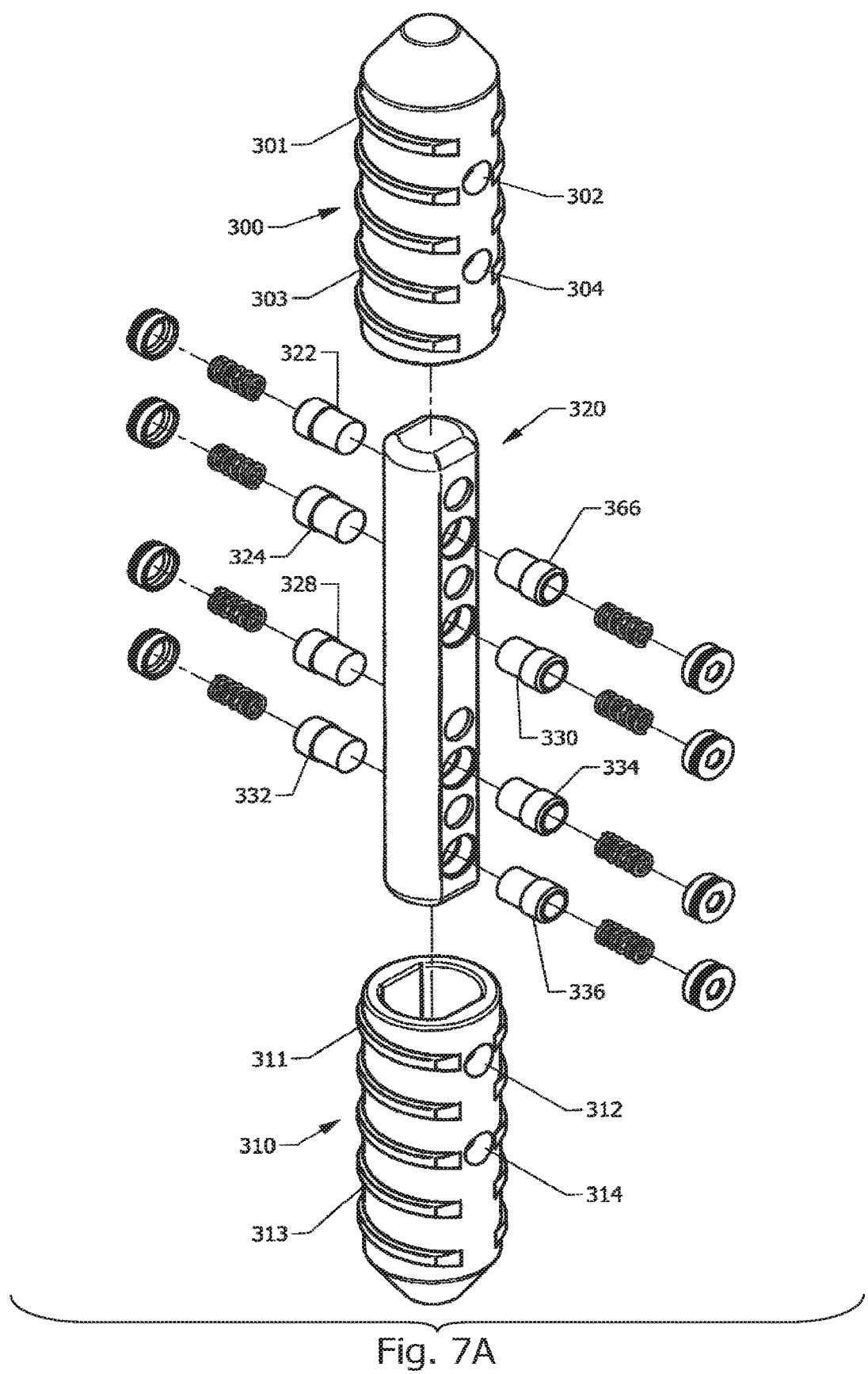

FIGS. 7 and 7A show a further example of the invention according to Example 7, wherein the re-inforcing bars (not shown) are attached or joined to paired opposed sleeve members 300, 310 and not to the internal rod member (concealed). The internal rod member 320 shown in FIG. 7A includes spring loaded detent pins 322-336 as previously described for Example 5 and 6 wherein the pin members engage the holes 302, 304 and 312, 314 in the sleeve members. In this version also, the opposed sleeve members are ribbed, for example 301, 303 and 311, 316, in a similar fashion to the ribs on the reinforcing bar (not shown) to effect a better grip with surrounding concrete.

FIG. 8 shows use of a plastic sleeve 340 to constrain the pins (not shown) of the rod member 106 before insertion into the sleeve member 100 of Example 5.

FIG. 8A shows an exploded view of the plastic sleeved assembly of FIG. 8 wherein the plastic sleeve 340 keeps the pins e.g. 108, 110 of the rod member 106 compressed against the springs (not shown) and wherein on inserting the rod member 106 into the sleeve member 100, slides the plastic sleeve 340 off the rod member 20, to free the pins to engage the holes, e.g. 108a, 110a of the sleeve member.

Figure 9:
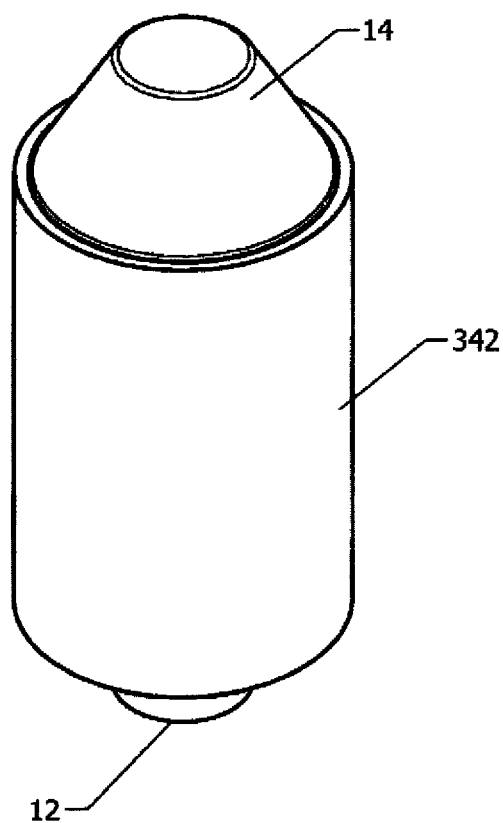

FIG. 9 shows use of a plastic sleeve 342 to keep the pins (not shown) joining the rod member 12 and the sleeve member 14 of the assembly of Example 1.

Figure 9A:
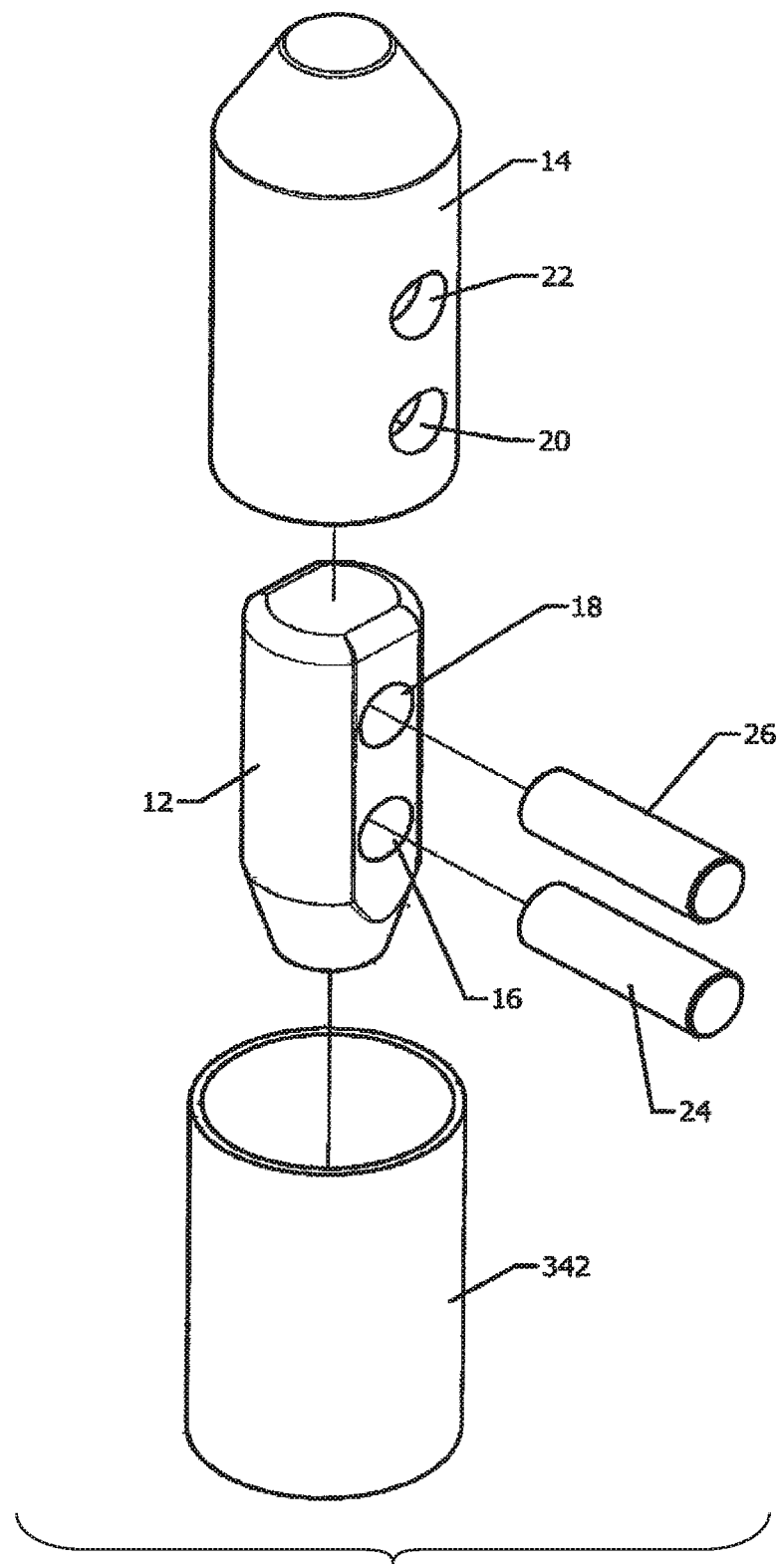

FIG. 9A shows an exploded view of FIG. 9 wherein the plastic sleeve 342 slides over the sleeve member 14 to keep in position the pins 24, 26 passing through holes 16, 18 in the rod member. In this version, the plastic sleeve is not slid off but functions as a keeper to keep the pins in place.

As previously indicated, the coupler or connector is manufactured from high tensile steel or can be from an equivalent strength material should that be developed in the future.

It will also be obvious to the skilled addressee that the number of holes and the number of pins used can be varied according to the strength of the coupled joint or the load to be borne by the joined reinforcing bars accordingly.

It will be obvious that the tensile load borne by the reinforcing bars will be converted into a shear force experienced by the pins.

It is envisaged that the advantages of the preferred coupler or connector as herein described are as follows:
   the bars do not need to be rotated which is very difficult when long lengths of reinforcing bars are being joined;
   the friction welding of the manufactured set of coupling mechanisms does not require any post heat treatment of the welded joint and has no heat affected zone which may cause weakness;
   there is no loss of strength at the joint due to threading of the reinforcing bar;
   there is no requirement for skilled operators to connect the bars, nor is there any time delay for grouting, or risk involved with mixing grout or torque fixing;
   the outer half of the set of the coupling mechanisms is of such a diameter that the critical concrete cover in columns conforms to engineering requirements, and
   bars of any length can be joined.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

In the specification the terms "comprising" and "containing" shall be understood to have a broad meaning similar to the term "including" and will be understood to imply the inclusion of a stated integer or step or group of integers or steps but not the exclusion of any other integer or step or group of integers or steps. This definition also applies to variations on the terms "comprising" and "containing" such as "comprise", "comprises", "contain" and "contains".

The invention claimed is:

1. A concrete encased coupler joining a first bar to a second bar, the coupler comprising:
   at least one tubular sleeve member having at least one open end;
   at least one elongate rod member having an insertion end adapted to be inserted into the open end tubular sleeve member;
   wherein the first bar and the second bar are attached to respective ends of the coupler, with the first bar attached to a member selected from the group consisting of said at least one tubular sleeve member and said at least one elongate rod member and the second bar attached to a member selected from the group consisting of said at least one tubular sleeve member and said at least one elongate rod member;
   the rod and sleeve members each having at least one transverse hole, which holes align when the rod member is inserted into the sleeve member;
   the rod member comprising one or more transverse spring loaded pin assemblies inserted in the transverse holes in the rod member, each such transverse hole in the rod member having a narrower diameter neck section adjacent one open end thereof defining a shoulder at its inner end, each pin assembly comprising a button having an enlarged base portion, the button extending through the neck section to the one open end with the shoulder abutting the base portion to prevent the button falling out of the transverse hole from the one open end, each pin assembly further comprising a spring member in the transverse holes biasing the base portion against the shoulder, and a locking member inserted into the other open end of the transverse hole to prevent the button from falling out the other open end, whereby the rod member, can be preloaded with a pin assembly in each of its transverse holes without the buttons falling out of either open end of its respective transverse holes, each pin assembly adapted to have its buttons extend radially outward from the rod member at the one open end and pass through the one or more aligned holes of the sleeve member when the rod member is inserted into the sleeve member.

2. The coupler of claim 1, wherein:
   the button is round and the transverse holes in the rod member and the sleeve member are circular.

3. The coupler of claim 1, wherein:
   the base portion of the button has a recess for accommodating receipt of the spring.

4. The coupler of claim 1, wherein:
   there are two through holes in each member, both sets being coaxial with each other, and the pin assemblies in each coaxial through hole is loaded in the opposite direction from the other.

5. The coupler of claim 1, wherein:
   the at least one sleeve member is externally configured or patterned to grip the surrounding concrete.

6. A coupler for joining a first bar to a second bar, the coupler comprising:
   at least one tubular sleeve member having at least one open end;
   at least one elongate rod member having an insertion end adapted to be inserted into the open end of the tubular sleeve member;
   wherein the first bar and the second bar are attachable to respective ends of the coupler, with the first bar attachable to a member selected from the group consisting of said at least one tubular sleeve member and said at least one elongate rod member and the second bar attachable to a member selected from the group consisting of said at least one tubular sleeve member and said at least one elongate rod member;
   the rod and sleeve members each having one or more transverse holes, which holes align when the rod member is inserted into the sleeve member;
   the rod member comprising at least one transverse spring loaded pin assemblies inserted in the transverse holes in the rod member, each pin adapted to extend radially outward from the rod member and pass through the at least one aligned holes of the sleeve member when the rod member is inserted into the sleeve member;
   and a tube having a diameter substantially similar to a diameter of the sleeve member, wherein the coupler is movable between:
   an inspection configuration, in which the rod member and sleeve member are disengaged and the tube substantially surrounds the rod member and radially constrains the pins, and
   a locked configuration, in which the tube is abutted against the open end of the sleeve member and the insertion end of the rod member is pushed into the sleeve member such that the tube is slidingly disengaged from the pins of the rod member in a direction towards the second bar to allow the pins to extend radially outward into the aligned holes of the sleeve member.

7. The coupler of claim 6, wherein:
   the spring loaded pin assemblies are inserted in the transverse holes in the rod member, each such transverse hole in the rod member having a narrower diameter neck section adjacent one open end thereof defining a shoulder at its inner end, each pin assembly comprising a button having an enlarged base portion, the button extending through the neck section to the one open end with the shoulder abutting the base portion to prevent the button falling out of the transverse hole from the one open end, each pin assembly further comprising a spring member in the transverse holes biasing the base portion against the shoulder, and a locking member inserted into the other open end of the transverse hole to prevent the button from falling out the other open end, whereby the rod member, can be preloaded with a pin assembly in each of its transverse holes without the buttons falling out of either open end of its respective transverse holes, each pin assembly adapted to have its buttons extend radially outward from the rod member at the one open end and pass through the at least one aligned holes of the sleeve member when the rod member is inserted into the sleeve member.

8. The coupler of claim 7, wherein:
   the button is round and the transverse holes in the rod member and the sleeve member are circular.

9. The coupler of claim 7, wherein:
   the base portion of the button has a recess for accommodating receipt of the spring.

10. The coupler of claims 7, wherein:
there are two through holes in each member, both sets being coaxial with each other, and the pin assemblies in each coaxial through hole is loaded in the opposite direction from the other.

11. The coupler of claim 6, wherein:
the at least one sleeve member is externally configured or patterned to grip the surrounding concrete.

* * * * *